United States Patent
Jain (10) Patent No.: US 11,265,690 B2
(45) Date of Patent: Mar. 1, 2022

(54) ECOSYSTEM-BASED WIRELESS NETWORK SETUP

(71) Applicant: Sling Media L.L.C., Foster City, CA (US)

(72) Inventor: Vikal Kumar Jain, Foster City, CA (US)

(73) Assignee: Sling Media L.L.C., Foster City, CA (US)

( * ) Notice: Subject to any disclaimer, the term of this patent is extended or adjusted under 35 U.S.C. 154(b) by 205 days.

(21) Appl. No.: 16/569,998

(22) Filed: Sep. 13, 2019

(65) Prior Publication Data

US 2021/0084466 A1 Mar. 18, 2021

(51) Int. Cl.
*H04W 4/50* (2018.01)
*H04L 9/32* (2006.01)
(Continued)

(52) U.S. Cl.
CPC ............ *H04W 4/50* (2018.02); *H04L 9/3215* (2013.01); *H04L 9/3271* (2013.01);
(Continued)

(58) Field of Classification Search
CPC ....... H04W 4/50; H04W 8/005; H04W 8/245; H04W 12/06; H04W 12/069; H04W 12/50; H04L 9/3215; H04L 9/3271; H04L 2209/80; H04L 65/1069; H04L 65/1059; H04L 63/083; H04L 63/062
See application file for complete search history.

(56) References Cited

U.S. PATENT DOCUMENTS 8,028,327 B1 * 9/2011 Talley ................ H04W 12/082
726/4
8,194,681 B2 * 6/2012 Kaarela ................ H04L 67/104
370/401
(Continued)

FOREIGN PATENT DOCUMENTS

| EP | 3 413 634 A1 | 12/2018 |
| WO | 2018/104006 A1 | 6/2018 |
| WO | 2018/172797 A1 | 9/2018 |

OTHER PUBLICATIONS

International Search Report and Written Opinion for PCT/IN2020/050694 dated Nov. 23, 2020, all pages.
(Continued)

*Primary Examiner* — Ivan O Latorre
(74) *Attorney, Agent, or Firm* — Kilpatrick Townsend & Stockton LLP (57) ABSTRACT

Various arrangements for configuring wireless network access for a first wireless device using a previously-configured second wireless device are presented. The first wireless device may output a temporary wireless network hotspot and advertise an identifier. A second wireless device may search for and identify the based on the advertised identifier. The second wireless device may connect with the temporary wireless network hotspot and provide wireless network credentials for a wireless network for which the second wireless device has previously been granted access. The may then establish a network connection with the wireless network based on the wireless network credentials transmitted by the second wireless device.

20 Claims, 6 Drawing Sheets

(51) Int. Cl.
*H04W 8/00* (2009.01)
*H04W 8/24* (2009.01)
*H04W 12/06* (2021.01)

(52) U.S. Cl.
CPC .......... *H04W 8/005* (2013.01); *H04W 8/245* (2013.01); *H04W 12/06* (2013.01); *H04L 2209/80* (2013.01)

(56) References Cited

U.S. PATENT DOCUMENTS

| | | | |
|---|---|---|---|
| 8,340,057 B2* | 12/2012 | Abujbara | G06F 21/305 370/338 |
| 8,576,773 B2* | 11/2013 | Pendakur | H04W 88/10 370/328 |
| 8,646,104 B2* | 2/2014 | Schneider | H04L 63/08 726/30 |
| 8,713,613 B2* | 4/2014 | Tranchina | B60N 2/879 725/75 |
| 9,009,801 B2* | 4/2015 | Shah | H04W 12/0431 726/6 |
| 9,307,408 B2* | 4/2016 | Gupta | H04L 9/3239 |
| 10,158,995 B2* | 12/2018 | Hillier | H04W 4/80 |
| 10,299,132 B2* | 5/2019 | Tas | H04W 12/08 |
| 10,383,037 B1 | 8/2019 | Patwardhan et al. | |
| 10,687,099 B2* | 6/2020 | Major | H04N 21/23106 |
| 10,863,225 B2* | 12/2020 | Hoang | H04L 67/06 |
| 2006/0020960 A1* | 1/2006 | Relan | H04N 7/1675 725/30 |
| 2006/0291660 A1* | 12/2006 | Gehrmann | H04L 63/045 380/277 |
| 2008/0250151 A1* | 10/2008 | Tomita | G06F 21/10 709/229 |
| 2009/0109941 A1* | 4/2009 | Carter | H04W 8/18 370/338 |
| 2013/0042292 A1* | 2/2013 | Buff | H04N 21/43637 725/127 |
| 2014/0162619 A1* | 6/2014 | Nicholson | H04L 63/068 455/418 |
| 2014/0191909 A1* | 7/2014 | Tinaphong | H01Q 1/2291 343/702 |
| 2014/0344689 A1 | 11/2014 | Scott et al. | |
| 2015/0097689 A1 | 4/2015 | Logue et al. | |
| 2016/0094994 A1 | 3/2016 | Kirkby et al. | |
| 2016/0105726 A1* | 4/2016 | Pendakur | H04W 88/08 725/54 |
| 2017/0064361 A1* | 3/2017 | Pinca, IV | H04N 21/4622 |
| 2017/0118638 A1* | 4/2017 | Zhang | H04W 12/069 |
| 2018/0159958 A1* | 6/2018 | Olive | H04L 67/30 |
| 2018/0206117 A1* | 7/2018 | Stahl | H04L 9/3263 |
| 2019/0104422 A1* | 4/2019 | Chiang | H04W 12/06 |
| 2019/0116087 A1 | 4/2019 | Hiller | |
| 2019/0394643 A1* | 12/2019 | Townend | H04W 48/20 |
| 2020/0084630 A1* | 3/2020 | Pan | H04W 76/14 |
| 2020/0220938 A1* | 7/2020 | McCann | H04W 12/06 |
| 2020/0314743 A1* | 10/2020 | Baki | H04W 12/08 |
| 2021/0136439 A1* | 5/2021 | Yao | H04N 21/4343 |

OTHER PUBLICATIONS

International Search Report and Written Opinion for PCT/US2020/047873 dated Oct. 5, 2020, all pages.

* cited by examiner

ECOSYSTEM-BASED WIRELESS NETWORK SETUP

BACKGROUND

Setting up a wireless network, such as a Wi-Fi network, on a wireless device for the first time can be inefficient and frustrating for a user. Setup can be especially frustrating if the wireless device being configured does not have a convenient user interface to enter wireless network credentials. For instance, a headless wireless device may not directly provide a user interface that allows for network credentials to be provided.

SUMMARY

Various embodiments are described related to a method for configuring wireless network access. In some embodiments, a method for configuring wireless network access is described. The method may include determining, by a first wireless device, that the first wireless device requires network credentials. The method may include, in response to determining that the first wireless device may require wireless network credentials, creating, by the first wireless device, a temporary wireless network hotspot. The method may include advertising, by the first wireless device, an identifier of the temporary wireless network hotspot. The method may include searching, by a second wireless device, for eligible wireless devices that require wireless network configuration. The method may include identifying, by the second wireless device, the temporary wireless network hotspot based on the advertised identifier. The method may include establishing, by the second wireless device, a wireless connection with the temporary wireless network hotspot in response to identifying the advertised identifier. The method may include transmitting, by the second wireless device, wireless network credentials for a wireless network for which the second wireless device has previously been granted access. The method may include establishing, by the first wireless device, a network connection with the wireless network based on the wireless network credentials transmitted by the second wireless device.

Embodiments of such a method may include one or more of the following features: in response to establishing the wireless connection with the temporary wireless network hotspot, authenticating the first wireless device. Authenticating the may include encrypting, by the second wireless device, a challenge value. The method may include transmitting, by the second wireless device, the challenge value to the via the temporary wireless network hotspot. The method may include decrypting, by the first wireless device, the challenge value using a stored private key. The method may include transmitting, by the first wireless device, the decrypted challenge value to the second wireless device via the temporary wireless network hotspot. Authenticating the may further include determining, by the second wireless device, that the may be authenticated based on the decrypted challenge value matching the challenge value. Authenticating the may include encrypting, by the second wireless device, a challenge value using a shared secret key. The shared secret key may be stored onto the first wireless device and the second wireless device during manufacture. The method may include transmitting, by the second wireless device, the challenge value to the via the temporary wireless network hotspot. The method may include decrypting, by the first wireless device, the challenge value using the shared secret key. The method may include transmitting, by the first wireless device, the decrypted challenge value to the second wireless device via the temporary wireless network hotspot. Authenticating the may further include determining, by the second wireless device, that the may be authenticated based on the decrypted challenge value matching the challenge value. The method may further include deactivating, by the first wireless device, the temporary wireless network hotspot in response to receiving the wireless network credentials for the wireless network for which the second wireless device has previously been granted access. The method may further include receiving, by the second wireless device, permission from a user to configure eligible wireless devices. The temporary wireless network hotspot and the wireless network may be Wi-Fi networks. The identifier of the temporary wireless network hotspot may be a first service set identifier (SSID) and the wireless network credentials may include: a second SSID; and a password. The may be an over-the-air (OTA) television channel receiver that may be electrically connected with an OTA antenna to receive broadcast television channels and transmit packetized broadcast television channels via the wireless network. The second wireless device may be an OTA streaming device that receives the broadcast television channels via the wireless network and outputs the broadcast television channels to a television.

In some embodiments, a system that configures wireless network access is described. The system may include a first wireless device. The may include a first wireless network interface. The may include one or more processors. The one or more processors may be configured to determine that the requires network credentials. The one or more processors, in response to determining that the first wireless device requires wireless network credentials, may create a temporary wireless network hotspot using the first wireless network interface. The one or more processors may be configured to advertise an identifier of the temporary wireless network hotspot. The one or more processors may be configured to establish a network connection with a wireless network based on wireless network credentials received from a second wireless device. The second wireless device may include a second wireless network interface and one or more processors. The one or more processors may be configured to search, using the second wireless network interface, for eligible wireless devices that require wireless network configuration. The one or more processors may be configured to identify the temporary wireless network hotspot based on the advertised identifier. The one or more processors may be configured to establish, using the second wireless network interface, a wireless connection with the temporary wireless network hotspot in response to identifying the advertised identifier. The one or more processors may be configured to transmit the wireless network credentials for the wireless network for which the second wireless device has previously been configured.

Embodiments of such a system may include one or more of the following features: the one or more processors of the second wireless device may be further configured to, in response to establishing the wireless connection with the temporary wireless network hotspot, authenticate the first wireless device. The one or more processors of the second wireless device may be further configured to encrypt a challenge value. The one or more processors of the second wireless device may be further configured to transmit, via the second wireless network interface, the challenge value to the via the temporary wireless network hotspot. The one or more processors of the may be further configured to decrypt the challenge value using a key. The one or more processors of the may be further configured to transmit the decrypted challenge value to the second wireless device via the temporary wireless network hotspot. The one or more processors of the second wireless device may be further configured to determine that the may be authenticated based on the decrypted challenge value matching the challenge value. The one or more processors of the may be further configured to deactivate, using the first wireless network interface, the temporary wireless network hotspot in response to receiving the wireless network credentials for the wireless network for which the second wireless device has previously been granted access. The one or more processors of the second wireless device may be further configured to receive permission from a user to configure eligible wireless devices. The one or more processors of the second wireless device may be further configured to, in response to the permission from the user and prior to establishing the wireless connection with the temporary wireless network hotspot, disconnect from the wireless network. The temporary wireless network hotspot and the wireless network may be Wi-Fi networks. The identifier of the temporary wireless network hotspot may be a first service set identifier (SSID) and the wireless network credentials may comprise: a second SSID; and a password. The may further include one or more over-the-air (OTA) television tuners. The may further include an OTA antenna port. The one or more processors of the may be further configured to receive broadcast television channels via the OTA antenna port and the one or more OTA television tuners and may cause packetized broadcast television channels to be transmitted via the first wireless network interface using the wireless network to the second wireless device. The second wireless device may be an OTA streaming device that comprises a high definition multimedia interface (HDMI) port. The OTA streaming device may receive the broadcast television channels via the wireless network and may output the broadcast television channels to a television via the HDMI port.

DETAILED DESCRIPTION

A user may have a wireless device that requires network credentials in order to access a wireless network, such as a Wi-Fi network that uses an IEEE 802.11 protocol. The wireless device may not have a convenient (or any) user interface that allows a user to provide the network credentials, such as an SSID (service set identifier) and password. For example, the wireless device may be a headless device that does not have a display or user interface. A headless wireless device may function without a graphical user interface or may not have a direct output that can be rendered on a display device, such as a television. Rather, a headless device may receive input and provide output through other interfaces such as a network interface or a serial port. Alternatively, the available user interface may be relatively inconvenient, such as an on-screen keyboard that would require navigation using a cursor or arrow keys on a remote control.

By leveraging a first wireless device, such as a streaming device, that has previously been set up for communication on a wireless network, a second wireless device, such as an over-the-air (OTA) receiver (which may be headless) can be easily configured. The first wireless device may detect or receive input indicating that a new second wireless device needs to be configured to communicate using the wireless network. The may disconnect from the wireless network and search for a temporary hotspot being advertised by the second wireless device. The may connect with the temporary hot spot, authenticate the second wireless device, and provide wireless network credentials. Such an arrangement can help prevent a user from manually needing to provide wireless network credentials to the second wireless device.

Figure 1:
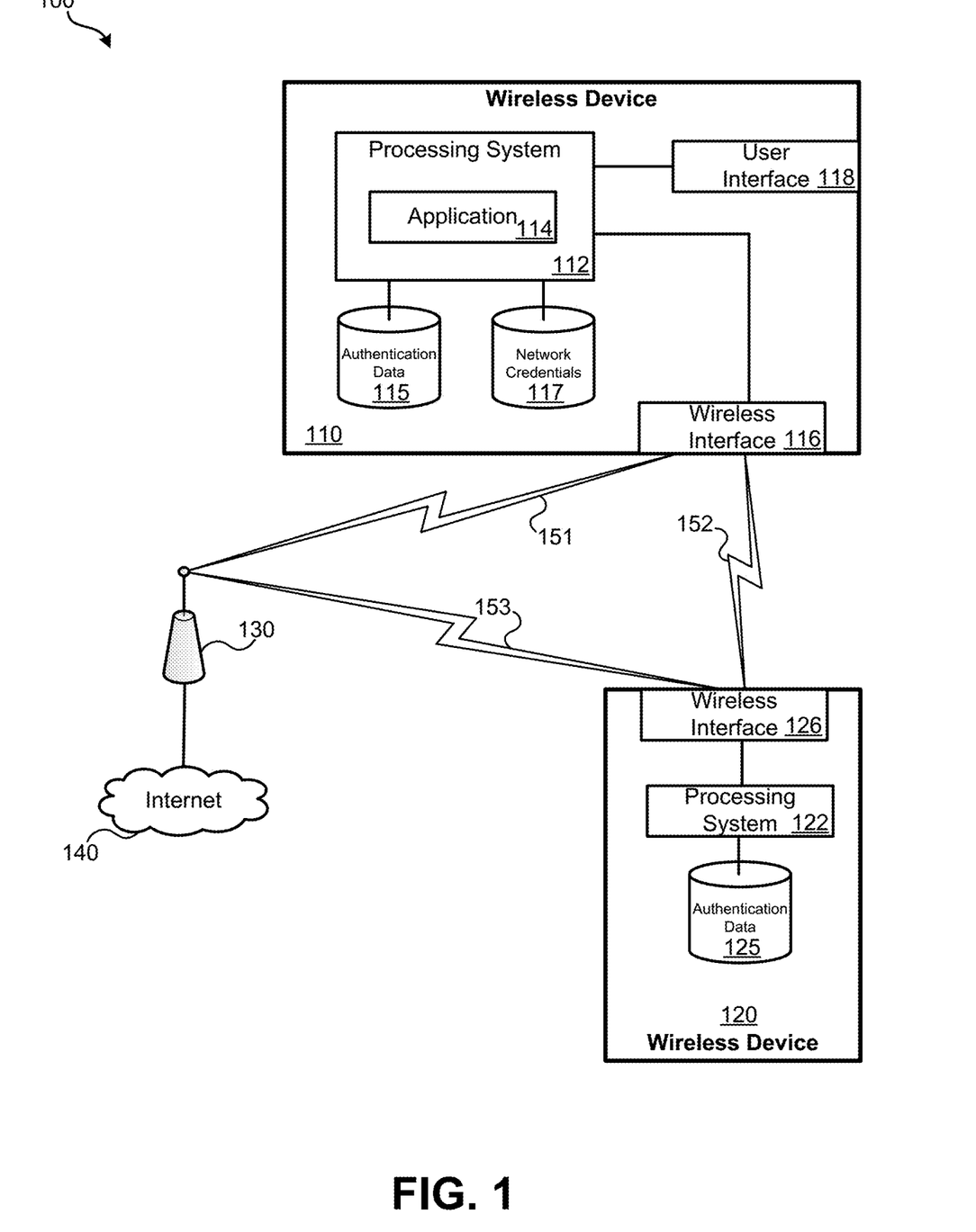
FIG. 1 illustrates a block diagram of an embodiment of a system for performing remote wireless network setup.

Further detail is provided in relation to the figures. FIG. 1 illustrates a block diagram of an embodiment of a system 100 for performing remote wireless network setup. System 100 can include: wireless device 110; wireless device 120; wireless access point (AP) 130; and the Internet 140. Wireless device 110 can represent a wireless device that is initially set up to have access to AP 130, such as by a user manually selecting or entering an SSID of AP 130 and a password (collectively referred to as the network credentials). Wireless device 120 does not initially have network credentials for AP 130 and may receive the network credentials from wireless device 110 automatically.

AP 130 may be a wireless router or a dedicated access point. AP 130 may communicate using an IEEE 802.11 communication protocol, which can also be referred to as Wi-Fi™. In order to access an IEEE 802.11 wireless network, a wireless device may require a network identifier, referred to as an SSID, and a password. Some wireless networks broadcast their SSIDs while others require that the correct SSID be supplied by the device attempting to join the wireless network. In other embodiments, AP 130 may use a wireless communication protocol other than Wi-Fi. AP 130 may be connected with the Internet 140 via an Internet Service Provider (ISP).

Wireless device 110 may include processing system 112; authentication data 115; wireless interface 116; network credentials 117; and user interface 118. Wireless device 110 may have a relatively convenient user interface 118. For example, a streaming media player connected to a television, a smart television, a smartphone, a tablet computer, or a gaming device may function as wireless device 110. Wireless device 110 can have a touchscreen display that allows a user to type directly on a touchscreen keyboard. Client devices may additionally or alternatively may output a graphical user interface (GUI) for presentation on another device. For instance, a streaming media player may output a GUI to a television for presentation. A user may interact with the GUI via a remote control or smart phone.

Processing system 112 may include one or more processors. Processing system 112 may include one or more special-purpose or general-purpose processors. Such special-purpose processors may include processors that are specifically designed to perform the functions detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD).

Application 114 may be executed using processing system 112. The code for application 114 may be stored using one or more non-transitory processor-readable mediums, such as a non-transitory processor-readable medium that is used to store authentication data 115, network credentials 117, or both. Application 114 can represent an application that is installed on wireless device 110 by a user or is part of an operating system or software package that comes installed on wireless device 110. Application 114 may be an application used to set up wireless device 120. For instance, application 114 may be an application released by a manufacturer of wireless device 120 that is available for download by a user from an online app store or comes pre-installed on wireless device 110.

Wireless interface 116 may be an IEEE 802-11 (Wi-Fi) wireless interface that can communicate with various Wi-Fi access points, such as AP 130. Wireless device 110 may receive, such as via user interface 118, wireless network credentials for use in connecting with AP 130 via wireless interface 116. Communication path 151 represents wireless interface 116 communicating with AP 130. A user may supply an SSID (or other form of wireless network identifier) and a password (if the wireless network is password protected). The SSID, password, or both may be stored to network credentials 117. Network credentials 117 may be stored using a non-transitory processor-readable medium. Application 114 may be permitted to retrieve network credentials 117 as needed. The network credentials supplied by a user may also be provided to an operating system executed by processing system 112. In some embodiments, the operating system executed by processing system 112 may maintain control over wireless interface 116 such that only the operating system can directly control wireless interface 116 connecting to a wireless network.

Wireless device 120, which needs to receive wireless network credentials in order to join the wireless network of AP 130, may include: processing system 122; wireless interface 126; and authentication data 125. Processing system 122 may include one or more processors. Processing system 122 may include one or more special-purpose or general-purpose processors. Such special-purpose processors may include processors that are specifically designed to perform the functions detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD).

When processing system 122 determines that either no wireless credentials have been provided or no wireless network is available, processing system 122 may cause wireless interface 126 to function as a temporary hotspot. Wireless interface 126, which can communicate using IEEE 802.11 (Wi-Fi), may advertise an SSID (or other form of identifier) and allow other devices, such as wireless device 110, to connect. The SSID or other form of identifier output by wireless device 120 may be a string of characters that identify wireless device 120 as a device that is eligible to receive wireless network credentials from wireless device 110. For instance, wireless device 110 and wireless device 120 may be provided by a same manufacturer. The SSID may be a string of characters or contain a string of characters that can signal to wireless device 110 that wireless device 120 should be provided wireless network credentials.

Wireless device 110 may disconnect from AP 130 and connect with the temporary hotspot advertised by wireless interface 126, thus causing data to be transmitted across communication path 152. In some embodiments, this communication path may be established using Wi-Fi, Bluetooth®, or some other wireless communication protocol that allows for device-to-device communication. Authentication data 115 may be used by processing system 112 to confirm that wireless device 120 is a device that should be permitted access to AP 130. For instance, authentication data 115 may be used to determine that wireless device 120 is an authentic device manufactured by the same manufacturer as wireless device 110. Authentication data 125 may be stored using a non-transitory processor-readable medium. Authentication data 125 may be used to perform authentication with wireless device 110. For instance, authentication data 125 may be used to answer a challenge from wireless device 110. Authentication data 125 could include a private key, shared key, or some other form of encryption data.

After wireless device 110 and wireless device 120 have completed authentication, network credentials 117 may be provided via wireless interface 116 directly to wireless interface 126 via communication path 152. Processing system 122 may then cause wireless interface 126 to use the received wireless credentials to join AP 130 and communicate via communication path 153.

Figure 2:
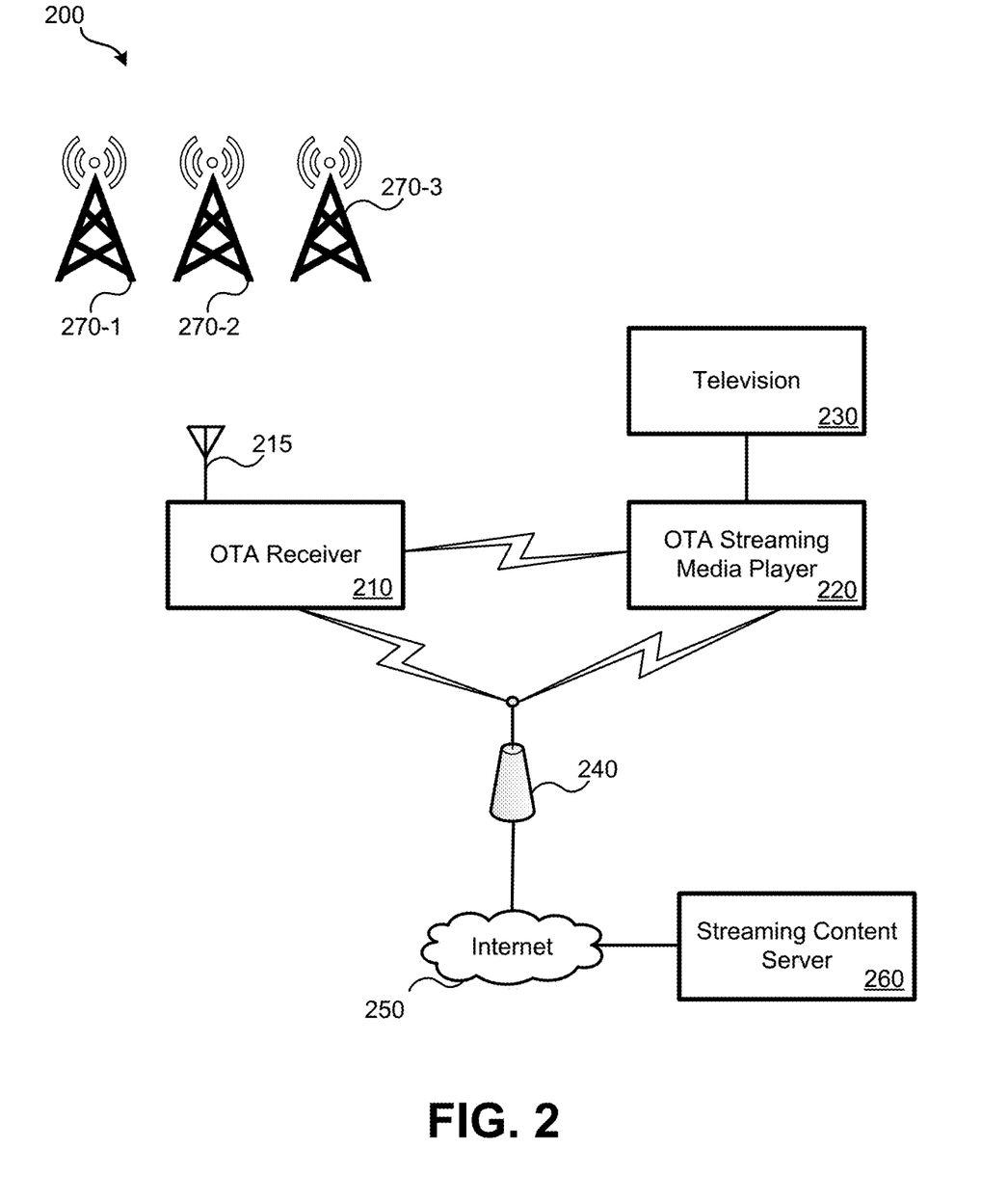
FIG. 2 illustrates a streaming over-the-air (OTA) system that performs remote wireless network setup.

FIG. 2 illustrates system 200 that can perform remote wireless network setup. System 200 can represent an embodiment of system 100. In system 200, OTA streaming media player 220 can function as wireless device 110 and OTA receiver 210 can function as wireless device 120. OTA receiver 210 can be a computerized device that receives broadcast OTA television channels that are broadcast on VHF or UHF frequency bands, packetizes the received OTA television channels, and transmits to OTA streaming media player 220. OTA streaming media player may receive such a packetized broadcast television channel via network 240 and may output the broadcast OTA television channel for output to television 230. Therefore, OTA streaming media player 220 can be used to output broadcast OTA television channels to television 230 despite the antenna only being connected with a remote device. A user may first configure OTA streaming media player 220. OTA streaming media player 220 may output a GUI for presentation to television 230. A user interface, such as an on-screen keyboard may be used to provide wireless credentials to OTA streaming media player 220. Such wireless network credentials may permit OTA streaming media player 220 to successfully access the Internet 250 and communicate with other devices connected with AP 240.

OTA receiver 210 may be a headless device that does not have a user interface that allows a user to easily provide input. OTA receiver 210 may require wireless network credentials for AP 240 in order to be able to communicate with OTA streaming media player 220 via AP 240. As detailed in relation to FIG. 1, OTA streaming media player 220 can search for a temporary hotspot created by OTA receiver 210, connect, perform authentication, and provide wireless network credentials for AP 240.

OTA receiver 210 may be electrically connected with OTA antenna 215. OTA antenna 215 may be used to receive multiple locally-broadcast television channels, such as VHF and UHF digital and analog broadcast television channels. Broadcast antennas 270 may be used to broadcast television channels over a given geographic area. OTA antenna 215 may receive one or more of these broadcast television channels. OTA receiver 210 may include one or more tuners that can each be tuned to a broadcast television channel. After OTA receiver 210 has been provided credentials for AP 240, OTA receiver 210 can transcode and packetize one or more broadcast television channels received via OTA antenna 215 and transmit the packetized broadcast television channel to OTA streaming media player 220 via AP 240. OTA streaming media player 220 can then output the packetized television channel for presentation via television 230.

OTA streaming media player 220 may be further configured to receive content from streaming content server 260 via Internet 250 and AP 240. Therefore, OTA streaming media player 220 may be able to output streams of OTA broadcast television channels from OTA receiver 210 and streaming content received via Internet 250 from streaming content server 260.

In some embodiments, a remote server, which may be part of streaming content server 260 or a separate system, may receive and store wireless network credentials. In such an arrangement, if a user orders a new wireless product, such as OTA receiver 210 from a manufacturer linked with the remote server, the wireless network credentials may come pre-loaded on the new wireless product such that it is ready to connect with the wireless network when powered up.

Figure 3:
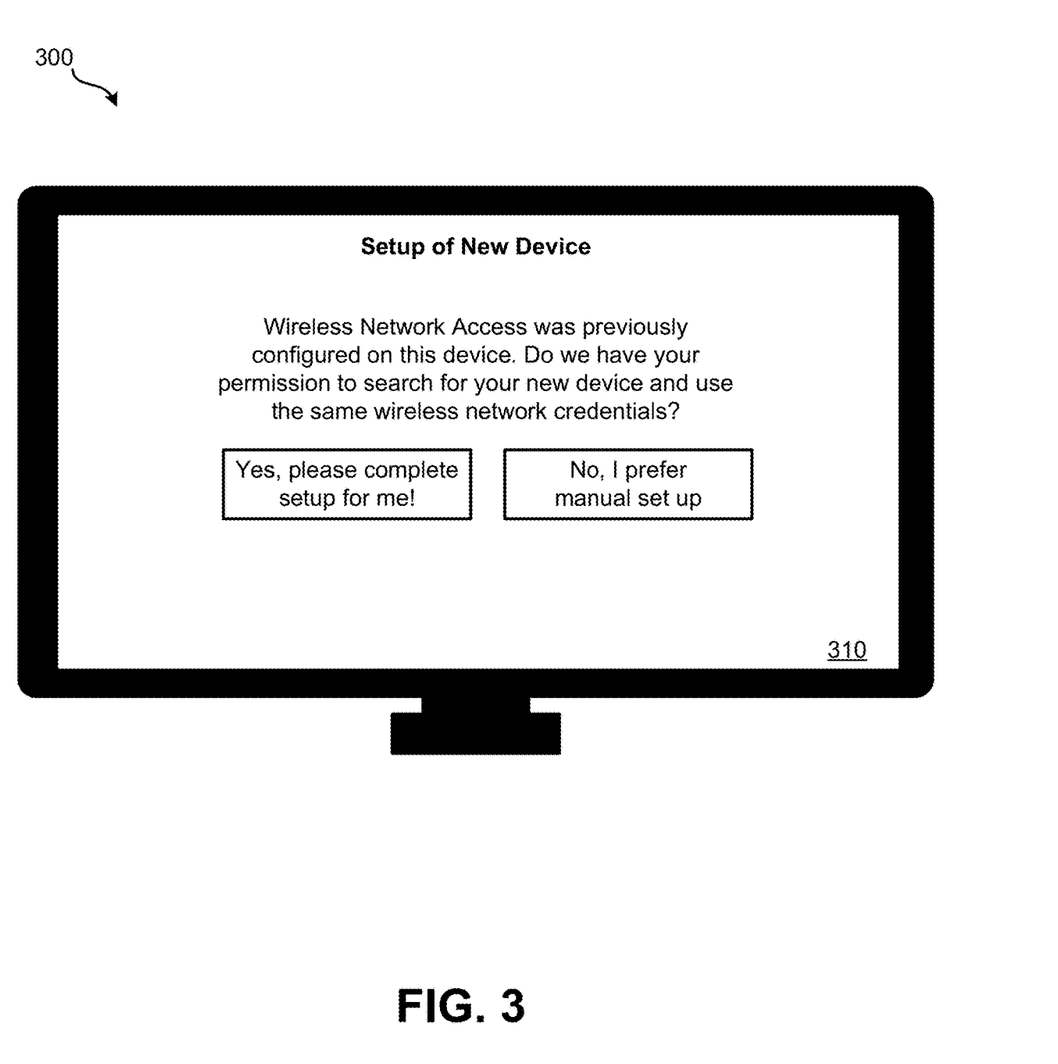
FIG. 3 illustrates an embodiment of a graphical user interface that a user can use to initialize setup of a remote wireless device.

FIG. 3 illustrates an embodiment 300 of a graphical user interface 310 that a user can use to initialize setup of a remote wireless device. Embodiment 300 represents a graphical user interface 310 that can be output by a wireless device to obtain authorization to provide wireless network credentials to another device. Referring to FIG. 1, GUI 310 may be output by wireless device 110. If a user provides an affirmative response, wireless credentials may be transmitted to wireless device 120. If the user provides a negative response, no wireless credentials may be provided. Referring to FIG. 2, GUI 310 may be output by OTA streaming media player 220 to television 230 for display. User input may be provided via an input device, such as a remote control or mobile device executing a remote control application, to OTA streaming media player 220. Alternatively, input may be provided to television 230 which can then transmit the input to OTA streaming media player 220. If a user provides an affirmative response, wireless credentials may be transmitted to OTA receiver 210 via a hot spot created by OTA receiver 210.

In another embodiment, a previously-configured wireless device may auto-detect an unconfigured wireless device that is advertising a pre-defined identifier in the broadcasted SSID's name. For instance, a device may create a Wi-Fi hotspot that uses a fixed set of characters as a prefix (or other form of character string), such as "OTA receiver". The previously-configured device may be programmed to identify this prefix (or other form of character string) and output an indication as to whether the identified new wireless device should be configured using the same wireless network credentials.

Figure 4:
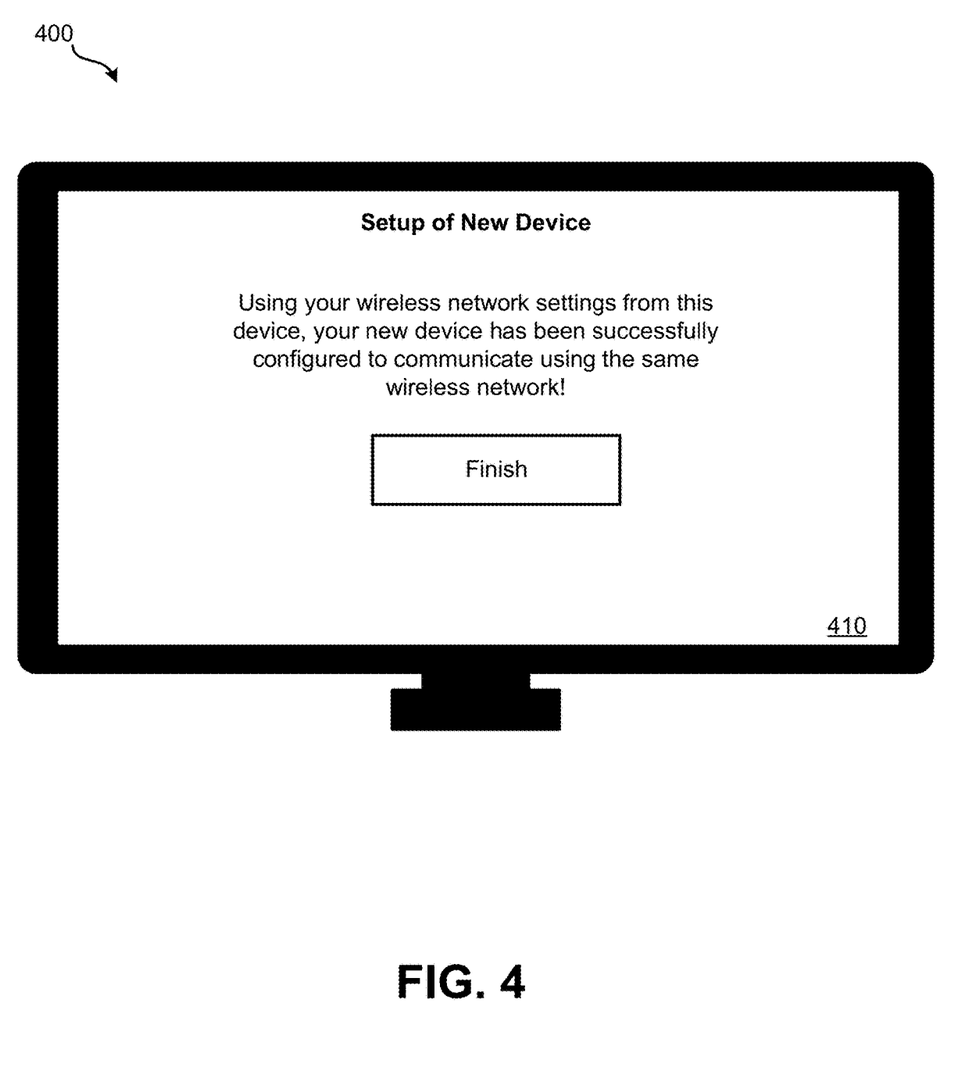
FIG. 4 illustrates an embodiment of a graphical user interface after wireless setup of remote wireless device has been successfully completed.

FIG. 4 illustrates an embodiment 400 of a graphical user interface 410 after wireless setup of remote wireless device has been successfully completed. GUI 410 may be presented after the wireless device that requires wireless credentials has successfully received the wireless credentials and has successfully joined the wireless network. Referring to FIG. 1, wireless device 120 may use the received wireless credentials to join the wireless network of AP 130. Wireless device 110 may then output GUI 410. Referring to FIG. 1, wireless device 120 may use the received wireless credentials to join the wireless network of AP 130. Wireless device 110 may then output GUI 410.

Figure 5A:
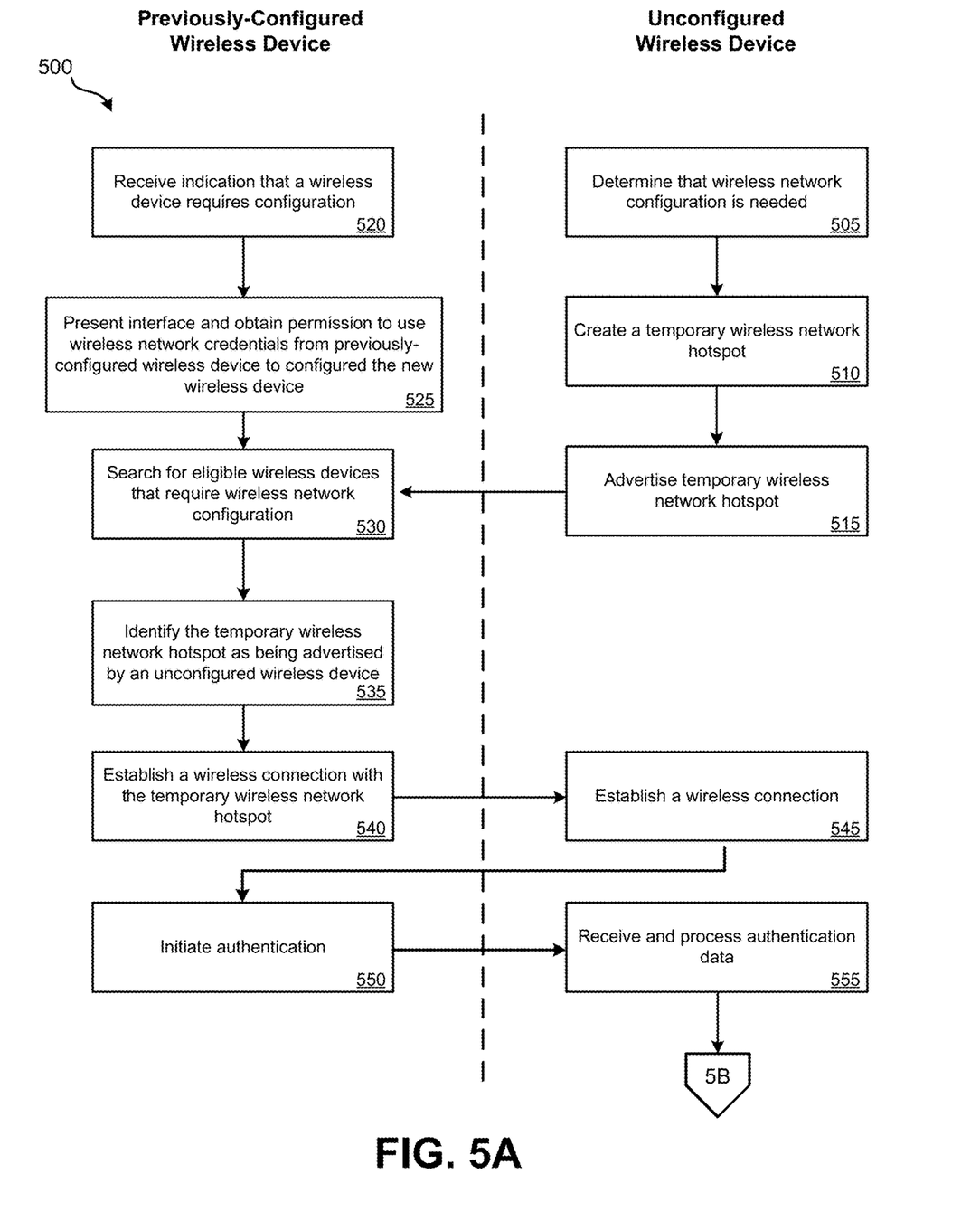
FIGS. 5A and 5B illustrate an embodiment of a method for performing wireless network setup using a wireless device on which the wireless network has previously been successfully set up.
Figure 5B:
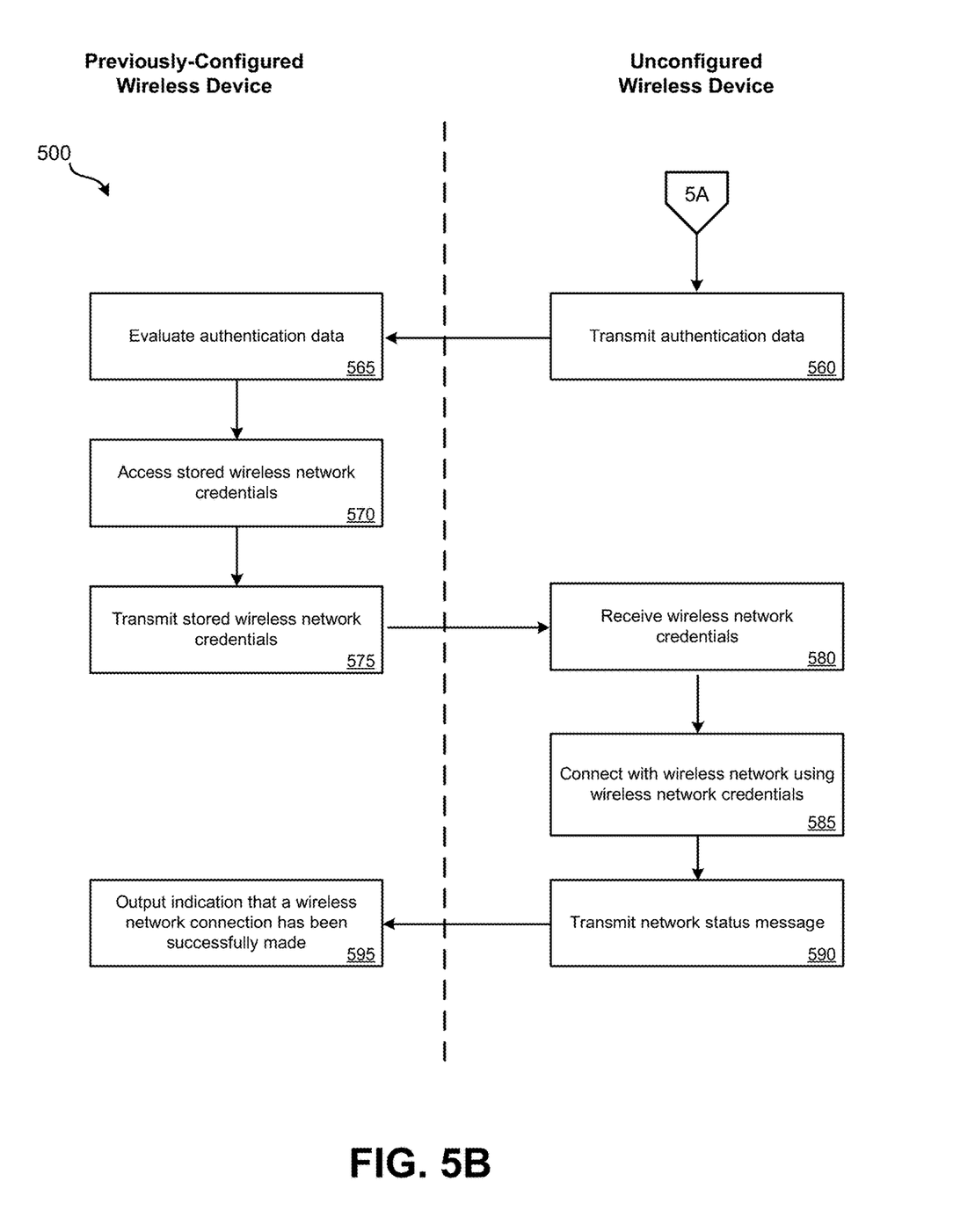

Various methods may be performed using the systems and interfaces detailed in relation to FIGS. 1-4. FIGS. 5A and 5B illustrate an embodiment of a method 500 for performing wireless network setup using a wireless device on which the wireless network has previously been successfully set up. Method 500 may be performed using system 100, system 200, or some other similar system that includes a wireless device that needs wireless credentials. Method 500 may be used to set up a Wi-Fi (or IEEE 802.11) wireless network for a wireless device. In other embodiments, a different type of wireless network may be set up.

At block 505, a wireless device that requires wireless network credentials (referred to as an "unconfigured wireless device") may determine that a wireless network configuration process is needed. Block 505 may be based on the unconfigured wireless device not having any stored wireless credentials or its stored wireless credentials do not permit it to access any currently-available wireless network. In response to block 505, a temporary wireless network hotspot may be created at block 510. The temporary wireless network hotspot may allow other devices to connect and communicate directly with the unconfigured wireless device. The temporary wireless network hotspot can include an identifier of the hotspot being advertised at block 515. For a Wi-Fi hotspot, an SSID may be transmitted as the wireless network hotspot identifier. Other wireless devices within range can search for advertised SSIDs.

At block 520, an indication that the unconfigured wireless device needs to be configured may be received by the previously-configured wireless device. The previously-configured wireless device has stored wireless network credentials that the previously-configured wireless device can use to communicate with the wireless network. Block 520 can include a user providing input that says a device needs to be initially configured or updated. Alternatively, block 520 may include the previously-configured wireless device searching for identifiers (e.g., SSIDs) indicative of an unconfigured wireless device. In some embodiments, at block 525, an interface may be presented to obtain user permission to use wireless network credentials used to configure the previously-configured wireless device to configure the unconfigured wireless device. An example of such an interface is presented in embodiment 300 of FIG. 3. This block may serve as a security step to ensure that the user desires to share wireless network credentials with a new device. If the user does not want to transmit the wireless network credentials, a user may be provided with the option of performing a manual setup procedure instead.

At block 530, a search for eligible wireless devices that require wireless network configuration may be performed. In some embodiments, block 530 is performed in place of block 520 to automatically detect when an unconfigured wireless device is in need of configuration. At block 530, a search may be performed of wireless networks that broadcast identifiers (SSIDs). The search may involve the previously-configured wireless device searching the broadcast identifiers for: 1) a particular string of characters; 2) a string of characters that falls within a particular range; or 3) a string of characters that, when decrypted, is indicative of a device needing configuration. At block 535, the temporary wireless network hotspot may be identified as having been advertised by an unconfigured wireless device. In some embodiments, the previously-configured wireless device and the unconfigured wireless device are manufactured by the same company or are part of a consortium that permits the sharing of wireless network credentials.

At block 540, a wireless connection may be established with the temporary wireless network hotspot. Since it may only be possible to be connected with a single wireless network at a given time, the previously-configured wireless device may disconnect from a wireless network in order to be able to connect with the temporary wireless network hotspot. At block 545, the unconfigured wireless device may establish the wireless communication connection with the previously-configured wireless device. As part of block 545, the unconfigured wireless device may cease to advertise or accept connections from other wireless devices. Therefore, while the previously-configured wireless device is connected, no additional wireless devices may be permitted to connect with the unconfigured wireless device via the temporary wireless network hotspot.

At blocks 550-565, an authentication process may be performed between the previously-configured wireless device and the unconfigured wireless device. This process may authenticate the unconfigured wireless device as being eligible to obtain wireless credentials. This process may also authenticate the previously-configured wireless device such that the unconfigured wireless device can trust received wireless credentials. Various forms of authentication may be performed, such as involving shared-secret encryption or public-private key pairs. The previously-configured wireless device may initiate authentication at block 550 by transmitting an encrypted challenge via the temporary hotspot to the unconfigured wireless device. At block 555, the challenge may be received by the unconfigured wireless device and processed. Using a stored key or some other form of secret information, the unconfigured wireless device may create an answer to the challenge. Method 500 continues on FIG. 5B. At block 560, the answer to the challenge may be transmitted at block 560. At block 565, the previously-configured wireless device may evaluate the answer to determine if the unconfigured wireless device is authenticated. A similar process may be performed to authenticate the previously-configured wireless device to the unconfigured wireless device.

Assuming that authentication is successful, method 500 proceeds to block 570. At block 570, wireless network credentials that have previously been stored may be accessed. The wireless network credentials may have been stored when the previously-configured wireless device was configured for wireless network access. For instance, an application being executed by the previously-configured wireless device to set up the unconfigured wireless device may have stored wireless network credentials, such as an SSID and a password. At block 575, the wireless network credentials may be transmitted, possibly in an encrypted format. The wireless network credentials may be received at block 580.

In response to successfully receiving the wireless network credentials, the configured wireless device may deactivate the temporary wireless network hotspot. The previously-configured wireless device may disconnect from the temporary wireless network hotspot and may reconnect to the wireless network for which the unconfigured wireless device is in the process of being configured.

At block 585, the unconfigured wireless device may use the received wireless network credentials to connect with the wireless network. If the connection is successful, a network status message may be transmitted at block 590 to the previously-configured wireless device via the wireless network with which a connection was established at block 585. An interface such as presented in embodiment 400 may be presented by the previously-configured wireless device at block 595.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for configuring wireless network access, the method comprising:
   (1) determining, by a headless over-the-air (OTA) receiver, that the headless OTA receiver requires network credentials, wherein:
      the headless OTA receiver does not include a user interface through which a user can directly provide wireless network credentials; and
      the headless OTA receiver receives broadcast television channels via VHF, UHF, or both frequency bands;

(2) in response to determining that the headless OTA receiver requires wireless network credentials, creating, by the headless OTA receiver, a temporary wireless network hotspot;

(3) advertising, by the headless OTA receiver, an identifier of the temporary wireless network hotspot;

(4) searching, by an OTA streaming media player device, for eligible wireless devices that require wireless network configuration;

(5) identifying, by the OTA streaming media player device, the temporary wireless network hotspot based on the advertised identifier;

(6) establishing, by the OTA streaming media player device, a wireless connection with the temporary wireless network hotspot in response to identifying the advertised identifier;

(7) transmitting, by the OTA streaming media player device, wireless network credentials for a wireless network for which the OTA streaming media player device has previously been granted access; and (8) establishing, by the headless OTA receiver, a network connection with the wireless network based on the wireless network credentials transmitted by the OTA streaming media player device, wherein
the headless OTA receiver and the OTA streaming media player device are distinct from an access point that provides the wireless network.

2. The method for configuring the wireless network access of claim 1, further comprising:
in response to establishing the wireless connection with the temporary wireless network hotspot, authenticating the headless OTA receiver.

3. The method for configuring the wireless network access of claim 2, wherein authenticating the headless OTA receiver comprises:
encrypting, by the streaming media player device, a challenge value;
transmitting, by the A streaming media player device, the challenge value to the headless OTA receiver via the temporary wireless network hotspot;
decrypting, by the headless OTA receiver, the challenge value using a stored private key; and
transmitting, by the headless OTA receiver, the decrypted challenge value to the streaming media player device via the temporary wireless network hotspot.

4. The method for configuring the wireless network access of claim 3, wherein authenticating the headless OTA receiver further comprises:
determining, by the streaming media player device, that the headless OTA receiver is authenticated based on the decrypted challenge value matching the challenge value.

5. The method for configuring the wireless network access of claim 2, wherein authenticating the headless OTA receiver comprises:
encrypting, by the streaming media player device, a challenge value using a shared secret key, wherein the shared secret key is stored onto the headless OTA receiver and the streaming media player device during manufacture;
transmitting, by the streaming media player device second wireless device, the challenge value to the headless OTA receiver via the temporary wireless network hotspot;
decrypting, by the headless OTA receiver, the challenge value using the shared secret key; and
transmitting, by the headless OTA receiver, the decrypted challenge value to the streaming media player device via the temporary wireless network hotspot.

6. The method for configuring the wireless network access of claim 5, wherein authenticating the headless OTA receiver further comprises:
determining, by the streaming media player device, that the headless OTA receiver is authenticated based on the decrypted challenge value matching the challenge value.

7. The method for configuring the wireless network access of claim 1, further comprising:
deactivating, by the headless OTA receiver, the temporary wireless network hotspot in response to receiving the wireless network credentials for the wireless network for which the streaming media player device has previously been granted access.

8. The method for configuring the wireless network access of claim 1, further comprising:
receiving, by the streaming media player device, permission from a user to configure eligible wireless devices, wherein, in response to receiving the permission, steps (4) through (8) are performed without user input.

9. The method for configuring the wireless network access of claim 1, wherein the temporary wireless network hotspot and the wireless network are Wi-Fi networks.

10. The method for configuring the wireless network access of claim 9, wherein the advertised identifier of the temporary wireless network hotspot is a first service set identifier (SSID) and the wireless network credentials comprise: a second SSID; and a password.

11. The method for configuring the wireless network access of claim 10, wherein:
the headless OTA receiver is an over-the-air (OTA) television channel receiver that is electrically connected with an OTA antenna to receive broadcast television channels and transmit packetized broadcast television channels via the wireless network; and
the streaming media player device is an OTA streaming device that receives the broadcast television channels via the wireless network and outputs the broadcast television channels to a television.

12. A system that configures wireless network access, the system comprising:
a headless OTA receiver, comprising:
a first wireless network interface; and
one or more processors, wherein the one or more processors are configured to:
determine that the headless OTA receiver requires network credentials;
in response to determining that the headless OTA receiver requires wireless network credentials, create a temporary wireless network hotspot using the first wireless network interface;
advertise an identifier of the temporary wireless network hotspot; and
establish a network connection with a wireless network based on wireless network credentials received from a streaming media player device; and the streaming media player device, comprising:
a second wireless network interface; and
one or more processors, wherein the one or more processors are configured to:
(1) search, using the second wireless network interface, for eligible wireless devices that require wireless network configuration;

(2) identify the temporary wireless network hotspot based on the advertised identifier;

(3) establish, using the second wireless network interface, a wireless connection with the temporary wireless network hotspot in response to identifying the advertised identifier; and (4) transmit the wireless network credentials for the wireless network for which the streaming media player device has previously been configured, wherein the headless OTA receiver and the OTA streaming media player device are distinct from an access point that provides the wireless network.

13. The system that configures wireless network access of claim 12, wherein the one or more processors of the streaming media player device are further configured to:

in response to establishing the wireless connection with the temporary wireless network hotspot, authenticate the headless OTA receiver.

14. The system that configures wireless network access of claim 13, wherein:

the one or more processors of the streaming media player device are further configured to:
encrypt a challenge value;
transmit, via the second wireless network interface, the challenge value to the headless OTA receiver via the temporary wireless network hotspot; and the one or more processors of the headless OTA receiver are further configured to:
decrypt the challenge value using a key; and
transmit the decrypted challenge value to the streaming media player device via the temporary wireless network hotspot.

15. The system that configures wireless network access of claim 14, wherein the one or more processors of the streaming media player device are further configured to:

determine that the headless OTA receiver is authenticated based on the decrypted challenge value matching the challenge value.

16. The system that configures wireless network access of claim 12, wherein the one or more processors of the headless OTA receiver are further configured to:

deactivate, using the first wireless network interface, the temporary wireless network hotspot in response to receiving the wireless network credentials for the wireless network for which the streaming media player device has previously been granted access.

17. The system that configures wireless network access of claim 12, wherein the one or more processors of the streaming media player device are further configured to:

receive permission from a user to configure eligible wireless devices, wherein, in response to receiving the permission, actions (1) through (4) are performed without user input.

18. The system that configures wireless network access of claim 17, wherein the one or more processors of the streaming media player device are further configured to:

in response to the permission from the user and prior to establishing the wireless connection with the temporary wireless network hotspot, disconnect from the wireless network.

19. The system that configures wireless network access of claim 12, wherein:

the temporary wireless network hotspot and the wireless network are Wi-Fi networks; and the advertised identifier of the temporary wireless network hotspot is a first service set identifier (SSID) and the wireless network credentials comprise: a second SSID; and a password.

20. The system that configures wireless network access of claim 12, wherein:

the headless OTA receiver further comprises:
one or more over-the-air (OTA) television tuners; and
an OTA antenna port, wherein:
the one or more processors of the headless OTA receiver are further configured to receive broadcast television channels via the OTA antenna port and the one or more OTA television tuners and cause packetized broadcast television channels to be transmitted via the first wireless network interface using the wireless network to the streaming media player device; and the streaming media player device is an OTA streaming device that comprises a high definition multimedia interface (HDMI) port, wherein the OTA streaming device receives the broadcast television channels via the wireless network and outputs the broadcast television channels to a television via the HDMI port.

* * * * *

UNITED STATES PATENT AND TRADEMARK OFFICE
CERTIFICATE OF CORRECTION

PATENT NO. : 11,265,690 B2
APPLICATION NO. : 16/569998
DATED : November 16, 2021
INVENTOR(S) : Vikal Kumar Jain It is certified that error appears in the above-identified patent and that said Letters Patent is hereby corrected as shown below:

In the Claims

In Claim 5, Column 11, Line 62, please delete the word "second"

In Claim 5, Column 11, Line 63, please delete the words "wireless device"

Signed and Sealed this
Nineteenth Day of July, 2022

Katherine Kelly Vidal
*Director of the United States Patent and Trademark Office*